US012532254B2

(12) United States Patent
Chandramouli et al.

(10) Patent No.: US 12,532,254 B2
(45) Date of Patent: Jan. 20, 2026

(54) METHODS, APPARATUSES, AND COMPUTER PROGRAM PRODUCTS FOR SUPPORTING ONBOARDING AND AUTHENTICATION OF USER EQUIPMENT FOR NETWORKS AND NETWORK SLICES

(71) Applicant: Nokia Technologies Oy, Espoo (FI)

(72) Inventors: Devaki Chandramouli, Plano, TX (US); György Wolfner, Budapest (HU)

(73) Assignee: Nokia Technologies Oy, Espoo (FI)

( * ) Notice: Subject to any disclaimer, the term of this patent is extended or adjusted under 35 U.S.C. 154(b) by 486 days.

(21) Appl. No.: 18/040,899

(22) PCT Filed: Jul. 23, 2021

(86) PCT No.: PCT/IB2021/056680
§ 371 (c)(1),
(2) Date: Feb. 7, 2023

(87) PCT Pub. No.: WO2022/029540
PCT Pub. Date: Feb. 10, 2022

(65) Prior Publication Data
US 2023/0319697 A1  Oct. 5, 2023

Related U.S. Application Data

(60) Provisional application No. 63/062,804, filed on Aug. 7, 2020.

(51) Int. Cl.
*H04W 48/18* (2009.01)
*H04W 8/26* (2009.01)
(Continued)

(52) U.S. Cl.
CPC ........... *H04W 48/18* (2013.01); *H04W 8/265* (2013.01); *H04W 12/06* (2013.01); *H04W 60/04* (2013.01)

(58) Field of Classification Search
CPC ..... H04W 48/18; H04W 48/20; H04W 8/265; H04W 12/06; H04W 60/04
See application file for complete search history.

(56) References Cited

U.S. PATENT DOCUMENTS

2015/0350870 A1   12/2015   Horn et al.
2020/0053083 A1   2/2020    Kunz et al.
(Continued)

FOREIGN PATENT DOCUMENTS

WO   2020/074063 A1   4/2020
WO   2020/098954 A1   5/2020

OTHER PUBLICATIONS

Office action received for corresponding European Patent Application No. 21748960.8, dated Jun. 14, 2024, 7 pages.
(Continued)

*Primary Examiner* — Wayne H Cai
(74) *Attorney, Agent, or Firm* — Barta Jones, PLLC

(57) ABSTRACT

Methods, apparatuses, and computer program products are described that support transmission and receipt of onboarding support and/or authentication requirement information to a UE for registration with a network, such as a PLMN and/or SNPN, and/or network slice, via a RAN and/or the like. The onboarding support and/or authentication requirement information may be specifically configured for one or more networks, and/or network slices thereof, that utilize a shared RAN in communication with the UE. The UE selects a cell and network and/or network slice based on the onboarding support and/or authentication requirement information. The UE may camp on the shared RAN. The one or more networks comprise at least a RAN and respective AMF that provide the onboarding support and/or authentication
(Continued)

requirement information to the UE before, or when, the UE contacts the AMF associated with the network and/or network slice.

3 Claims, 11 Drawing Sheets

(51) Int. Cl.
   *H04W 12/06* (2021.01)
   *H04W 60/04* (2009.01)

(56) References Cited

U.S. PATENT DOCUMENTS

2024/0224163 A1* 7/2024 Starsinic ............... H04W 60/04
2024/0267869 A1* 8/2024 Nayak .................. H04W 76/10

OTHER PUBLICATIONS

"3rd Generation Partnership Project; Technical Specification Group Services and System Aspects; System architecture for the 5G System (5GS); Stage 2 (Release 16)", 3GPP TS 23.501, V16.5.0, Jul. 2020, pp. 1-441.
"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
"Reply LS on Questions on onboarding requirements", 3GPP TSG-SA WG1 Meeting #90, S1-202266, SA1, May 18-22, 2020, 2 pages.
"KI#4, new solution, RAN impacts due to KI#4", SA WG2 Meeting #139e, S2-2003611, Agenda Item: 8.2, Ericsson, Jun. 1-12, 2020, pp. 1-3.
"Msc-generator", Sourceforge, Retrieved on Mar. 17, 2023, Webpage available at : https://sourceforge.net/projects/msc-generator/.
"IEEE 802.11", Wikipedia, Retrieved on Mar. 17, 2023, Webpage available at : https://en.wikipedia.org/wiki/IEEE_802.11.
"IEEE 802.16", Wikipedia, Retrieved on Mar. 17, 2023, Webpage available at : https://en.wikipedia.org/wiki/IEEE_802.16.
"IEEE 802.3", Wikipedia, Retrieved on Mar. 17, 2023, Webpage available at : https://en.wikipedia.org/wiki/IEEE_802.3.
International Search Report and Written Opinion received for corresponding Patent Cooperation Treaty Application No. PCT/IB2021/056680, dated Oct. 18, 2021, 13 pages.
"3rd Generation Partnership Project; Technical Specification Group Services and System Aspects; Study on enhanced support of non-public networks (Release 17)", 3GPP TR 23.700-07, V0.4.0, Jun. 2020, pp. 1-159.
"Update to Solution #5: UE Onboarding and provisioning for an SNPN", SA WG2 Meeting #139E, S2-2004379, Agenda Item: 8.3, InterDigital Inc, Jun. 1-12, 2020, 6 pages.
"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

* cited by examiner

METHODS, APPARATUSES, AND COMPUTER PROGRAM PRODUCTS FOR SUPPORTING ONBOARDING AND AUTHENTICATION OF USER EQUIPMENT FOR NETWORKS AND NETWORK SLICES

RELATED APPLICATION

This application was originally filed as PCT Application No. PCT/IB2021/056680, filed on Jul. 23, 2021, which claims the benefit of priority of U.S. Provisional Patent Application No. 63/062,804, filed on Aug. 7, 2020, both of which are incorporated herein by reference in their entirety.

TECHNOLOGICAL FIELD

An example embodiment relates generally to the communication of onboarding support information and authentication requirement information to user equipment for registration with a network and/or a network slice.

BACKGROUND

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards. The 5G network has been designed as a Service Based Architecture (SBA) or, in other words, a system architecture in which the system functionality is achieved by a set of network functions providing services to other authorized network functions to access their services.

The 5G network system allows for the support of network slices, which are end-to-end logical networks which support a certain set of network functions. As such, a network slice is a logical network infrastructure which provides specific network capabilities and network characteristics. Across a 5G network, comprising a plurality of network slices, particular network slices can be configured to support particular features (e.g., hardware specifications, network functions, domain access, etc.) that are not common to all network slices. User equipment can be configured to access multiple networks and/or network slices over a shared access point. Access to network slices can be restricted to user equipment that is associated with certain credentials or meets certain requirements.

Network slicing as introduced by 5G systems incorporates the concept of allowing differentiated treatment of user equipment dependent on each customer's particular requirements. Thus, network slicing in 5G systems makes it possible for Mobile Network Operators (MNO) to consider customers as belonging to different tenant types with each tenant type having respective service requirements. The service requirements of a particular tenant group are governed in accordance with respect to the network slice types associated with each tenant type. User equipment belonging to a particular tenant type is eligible to use network slices specified according to their respective Service Level Agreement (SLA) and subscriptions.

The 5G system introduces and allows for the support of Non-Public Networks (NPNs) which are 5G system deployed networks for non-public use. As such NPNs are either a Stand-Alone Non-Public Network (SNPN) which does not rely on network functions provided by a Public Land Mobile Network (PLMN), or a Public Network Integrated NPN (PNI-NPN) which does operate with the support of a PLMN. In order for user equipment to access NPNs onboarding procedures are carried out between the user equipment and the network to ensure that the user equipment either possess or can obtain the appropriate credentials.

BRIEF SUMMARY

Methods, apparatuses, and computer program products are disclosed which facilitate the communication of onboarding support information and authentication requirement information between one or more networks, and/or network slices thereof, and one or more user equipment. The present disclosure provides procedures related to the communication of onboarding support information and authentication requirement information of user equipment for SNPNs, PNI-NPNs, PLMNs, the like, or combinations thereof by way of shared radio access networks and/or access and mobility management functions associated with one or more networks. An example embodiment includes a network infrastructure which transmits and receives information (e.g., onboarding support information, authentication requirement information, registration information, etc.), by way of a radio access network (RAN) and/or access and mobility management function (AMF), about the availability of onboarding and authentication functions for supported networks, and/or network slices, to user equipment prior to the user equipment establishing contact with a network function (e.g., AMF, etc.) and/or during initial contact between the user equipment and the network function.

According to one aspect of the present disclosure, there is provided a method that comprises causing broadcast, via a network, of onboarding support information, associated with at least a network slice, to a user equipment. Additionally, the method comprises receiving, via the network, a connection request comprising information identifying a selected network slice, that supports onboarding for unsubscribed user equipment, from the user equipment. In accordance with some embodiments, the method further includes registering the user equipment with the selected network slice. Furthermore, the registering of the user equipment with the selected network slice comprises sending a network slice specific credential to the user equipment. According to some embodiments, and in response to completion of the registration process, the method may further comprise establishing, via the network, a connection between the user equipment and the selected network slice.

In some embodiments of the method, the onboarding support information comprises one or more of a network slice specific authentication requirement or a network slice specific onboarding availability for at least the network slice. In some embodiments of the method, the network slice specific authentication requirement comprises an indication of whether an authentication of the user equipment with the network slice is required for registering the user equipment with the network and the selected network slice, and wherein the network slice specific onboarding availability comprises an indication of whether onboarding is supported by the network slice. In some embodiments of the method, the broadcasting of the onboarding support information to the user equipment is performed by way of a radio access network node. In some embodiments of the method, the network comprises one or more of a public land mobile network, a stand-alone non-public network, or a public network integrated non-public network.

According to another aspect of the present disclosure, there is provided an apparatus that comprises at least one processor and at least one memory with the at least one memory including computer program code, that is configured to, with the at least one processor, cause the apparatus at least to cause a broadcast, via a network, of onboarding support information, associated with at least a network slice, to a user equipment. The apparatus is further caused by the computer program code configured with the at least one processor to receive, via the network, a connection request comprising information identifying a selected network slice, that supports onboarding for unsubscribed user equipment, from the user equipment. In accordance with some embodiments, the apparatus may be further caused to register the user equipment with the selected network slice. In such embodiments, the registration of the user equipment with the selected network slice may comprise sending an additional network slice specific credential to the user equipment. According to some embodiments, and in response to completion of the registration process, the apparatus may further be caused by the computer program code to establish a connection between the user equipment and the selected network slice by way of the network infrastructure.

In some embodiments of the apparatus, the onboarding support information comprises one or more of a network slice specific authentication requirement or a network slice specific onboarding availability for at least the network slice. In some embodiments of the apparatus, the network slice specific authentication requirement comprises an indication of whether an authentication of the user equipment with the network slice is required for registering the user equipment with the network and the selected network slice, and wherein the network slice specific onboarding availability comprises an indication of whether onboarding is supported by the network slice. In some embodiments of the apparatus, the broadcasting of the onboarding support information to the user equipment is performed by way of a radio access network node. In some embodiments of the apparatus, the network comprises one or more of a public land mobile network, a stand-alone non-public network, or a public network integrated non-public network.

According to another aspect of the present disclosure, there is provided a computer program product that comprises at least a non-transitory computer readable storage medium having program code portions stored thereon with the program code portions being configured, upon execution, to cause a broadcast of onboarding support information, associated with at least a network slice, to a user equipment by way of a communication network and infrastructure associated therewith. Moreover, program code portions are configured to receive, via the communication network, a connection request comprising information identifying a selected network slice, that supports onboarding for unsubscribed user equipment, from the user equipment. In some embodiments, the program code portions are further configured, upon execution, to register the user equipment with the selected network slice. According to such embodiments, the registration of the user equipment with the selected network slice comprises transmission of a network slice specific credential to the user equipment. Upon satisfactory completion of the registration process, the computer program product may be further configured to establish, by way of the network and associated hardware and software infrastructure, a connection between the user equipment and the selected network slice.

In some embodiments of the computer program product, the onboarding support information comprises one or more of a network slice specific authentication requirement or a network slice specific onboarding availability for at least the network slice. In some embodiments of the computer program product, the network slice specific authentication requirement comprises an indication of whether an authentication of the user equipment with the network slice is required for registering the user equipment with the network and the selected network slice, and wherein the network slice specific onboarding availability comprises an indication of whether onboarding is supported by the network slice. In some embodiments of the computer program product, the broadcasting of the onboarding support information to the user equipment is performed by way of a radio access network node. In some embodiments of the computer program product, the network comprises one or more of a public land mobile network, a stand-alone non-public network, or a public network integrated non-public network.

According to another aspect of the present disclosure, there is provided an apparatus that comprises means for causing broadcast, via a network, of onboarding support information, associated with at least a network slice, to a user equipment. Further, the apparatus comprises means for receiving, via the network, a connection request comprising information identifying a selected network slice, that supports onboarding for unsubscribed user equipment, from the user equipment. In accordance with some embodiments, the apparatus further includes means for registering the user equipment with the selected network slice. As such, the registration of the user equipment with the selected network slice comprises sending a network slice specific credential to the user equipment. The network slice specific credential may be a primary or secondary credential that may or may not have been previously communicated to the user equipment. According to some embodiments, and in response to completion of the registration process, the apparatus may further comprise means for establishing, via the network, a connection between the user equipment and the selected network slice.

In some embodiments of the apparatus, the onboarding support information comprises one or more of a network slice specific authentication requirement or a network slice specific onboarding availability for at least the network slice. In some embodiments of the apparatus, the network slice specific authentication requirement comprises an indication of whether an authentication of the user equipment with the network slice is required for registering the user equipment with the network and the selected network slice, and wherein the network slice specific onboarding availability comprises an indication of whether onboarding is supported by the network slice. In some embodiments of the apparatus, the broadcasting of the onboarding support information to the user equipment is performed by way of a radio access network node. In some embodiments of the computer program product, the network comprises one or more of a public land mobile network, a stand-alone non-public network, or a public network integrated non-public network.

According to another aspect of the present disclosure, there is provided a method which includes at least receiving, via a network, onboarding support information associated with each of a plurality of network slices. The method further comprises selecting a network slice from the plurality of network slices that supports onboarding of unsubscribed user equipment. Accordingly, the network slice is selected, by a communication device, based on the onboarding support information. Moreover, the method additionally includes selecting a cell of the network that is associated with the selected network slice. According to some embodiments the method may further comprise causing transmission, utilizing the network, of a connection request for connection initiation with the selected network slice to an access and mobility management function associated with the selected network slice. In such embodiments, the method may include receiving, via the network and in response to the transmission of the connection request, registration information from the access and mobility management function. Additionally, the registration information may comprise additional onboarding support information required to connect to the selected network slice, such as primary and/or secondary credential requirements not previously communicated. Furthermore, the method can comprise connecting, via the network, to the selected network slice.

In some embodiments of the method, the onboarding support information comprises one or more of a network slice specific authentication requirement or a network slice specific onboarding availability for each of the plurality of network slices. In some embodiments of the method, the network slice specific authentication requirement comprises an indication of whether an authentication of the user equipment with each of the plurality of network slices is required for registering the user equipment with the selected network slice. In accordance with some embodiments of the method, the network slice specific onboarding availability comprises an indication of whether onboarding is supported by each of the plurality of network slices.

According to another aspect of the present disclosure, there is provided an apparatus that comprises at least one processor and at least one memory with the at least one memory including computer program code, that is configured to, with the at least one processor, cause the apparatus at least to receive, via a network, onboarding support information associated with each of a plurality of network slices. In response to the received information, the apparatus is further caused to select a network slice from the plurality of network slices that supports onboarding of unsubscribed user equipment. The network slice is selected based on the onboarding support information. Moreover, the apparatus is configured to additionally select a cell of the network that is associated with the selected network slice. Some embodiments of the apparatus may be configured to transmit, via the network, a connection request for connection initiation with the selected network slice to an access and mobility management function associated with the selected network slice. Additionally, or alternatively, the apparatus may be configured to receive, via the network in response to a transmitted request, registration information from the access and mobility management function. Such registration information may comprise additional onboarding support information required to connect to the selected network slice. The additional information may include additional credential requirements. Furthermore, the apparatus of an example embodiment may be configured to connect to the selected network slice by way of the network and associated components thereof.

In some embodiments of the apparatus, the onboarding support information comprises one or more of a network slice specific authentication requirement or a network slice specific onboarding availability for each of the plurality of network slices. In some embodiments of the apparatus, the network slice specific authentication requirement comprises an indication of whether an authentication of the user equipment with each of the plurality of network slices is required for registering the user equipment with the selected network slice. In accordance with some embodiments of the apparatus, the network slice specific onboarding availability comprises an indication of whether onboarding is supported by each of the plurality of network slices.

According to another aspect of the present disclosure, there is provided a computer program product that comprises at least a non-transitory computer readable storage medium having program code portions stored thereon with the program code portions being configured, upon execution, to receive, via a network, onboarding support information associated with each of a plurality of network slices. In response to the received information, the program code portions are further configured to select a network slice from the plurality of network slices that supports onboarding of unsubscribed user equipment. The program code portions are configured to select the network slice according to predefined criteria and at least the onboarding support information. Moreover, the program code portions are configured, upon execution, to additionally select a cell of the network that is associated with the selected network slice. Some embodiments of the computer program product may include program code portions configured to transmit over the network a connection request for connection initiation with the selected network slice to an access and mobility management function associated with the selected network slice. In some embodiments, the computer program product may include program code portions configured to receive, via the network and as a response to a previously transmitted request, registration information from the access and mobility management function. Accordingly, the registration information may comprise additional onboarding support information required to connect to the selected network slice and, indeed, such additional information may include additional credential requirements. Furthermore, embodiments of the computer program product may include program code portions configured to cause a communicable connection from an apparatus to the selected network slice by way of the network and associated components thereof.

In some embodiments of the computer program product, the onboarding support information comprises one or more of a network slice specific authentication requirement or a network slice specific onboarding availability for each of the plurality of network slices. In some embodiments of the computer program product, the network slice specific authentication requirement comprises an indication of whether an authentication of the user equipment with each of the plurality of network slices is required for registering the user equipment with the selected network slice. In accordance with some embodiments of the computer program product, the network slice specific onboarding availability comprises an indication of whether onboarding is supported by each of the plurality of network slices.

According to another aspect of the present disclosure, there is provided an apparatus that comprises means for receiving, by way of a network, onboarding support information associated with each of a plurality of network slices. The apparatus further comprises means for selecting a network slice from the plurality of network slices that supports onboarding of unsubscribed user equipment. Accordingly, the network slice is selected, by a communication device, based on the onboarding support information. Moreover, the apparatus additionally includes means for selecting a cell of the network that is associated with the selected network slice. According to some embodiments the apparatus may further comprise means for transmitting, utilizing the network, a connection request for connection initiation with the selected network slice to an access and mobility management function associated with the selected network slice. In such embodiments, the apparatus may further comprise means for receiving, via the network and in response to the transmission of the connection request, registration information from the access and mobility management function. Additionally, the registration information may comprise additional onboarding support information required to connect to the selected network slice, such as primary and/or secondary credential requirements not previously communicated over the network to an associated communication device. Furthermore, the apparatus may provide means for connecting over one or more communication networks to one or more selected network slices.

In some embodiments of the apparatus, the onboarding support information comprises one or more of a network slice specific authentication requirement or a network slice specific onboarding availability for each of the plurality of network slices. In some embodiments of the apparatus, the network slice specific authentication requirement comprises an indication of whether an authentication of the user equipment with each of the plurality of network slices is required for registering the user equipment with the selected network slice. In accordance with some embodiments of the apparatus, the network slice specific onboarding availability comprises an indication of whether onboarding is supported by each of the plurality of network slices.

According to another aspect of the present disclosure, there is provided a method comprising receiving, from at least an access and mobility management function, onboarding support information and authentication requirement information associated with one or more networks. In some embodiments, the one or more networks comprise a public land mobile network or a stand-alone non-public network. The method may further comprise causing one or more broadcasts of the onboarding support information and the authentication requirement information such that the broadcast is received by at least a user equipment. Some embodiments of the method may further comprise receiving, from the user equipment, a connection request comprising information identifying a selected network of the one or more networks, that supports onboarding for unsubscribed user equipment. Moreover, the method can include transmitting, to at least the access and mobility management function, a registration request, based on the network selection and the connection request and/or transmitting, to at least the access and mobility management function, a registration request, based on the network selection and the connection request. In some embodiments the method further comprises receiving, from at least the access and mobility management function, a registration response. Further, the method may include establishing a connection between the user equipment and the selected network.

In some embodiments of the method, the one or more networks further comprise one or more of a public network integrated non-public network or a network slice. In some embodiments of the method, the access and mobility management function comprises a plurality of access and mobility management functions. Accordingly, each access and mobility function may be further associated with at least a respective network of the one or more networks such that each access and mobility function may cause broadcasting of respective onboarding support and/or authentication requirement information. In some embodiments of the method, the onboarding support information is received and transmitted via a system information block transmission. In accordance with some embodiments of the method, the system information block transmission is either transmitted in response to a request from the user equipment and/or as a continuous broadcast to a plurality of user equipment camping on a cell shared by the one or more networks.

According to another aspect of the present disclosure, there is provided an apparatus that comprises at least one processor and at least one memory with the at least one memory including computer program code, that is configured to, with the at least one processor, cause the apparatus at least to receive, from at least an access and mobility management function, onboarding support information and authentication requirement information associated with one or more networks. The one or more networks comprise a public land mobile network or a stand-alone non-public network. Additionally, the apparatus may be further configured to cause broadcast, to at least a user equipment, of the onboarding support information and the authentication requirement information. The apparatus, according to an example embodiment, may be further caused to receive, from the user equipment, a connection request comprising information identifying a selected network of the one or more networks, that supports onboarding for unsubscribed user equipment. Additional embodiments of the apparatus may be configured to transmit, to at least the access and mobility management function, a registration request, based on the network selection and the connection request and to receive, from at least the access and mobility management function, a registration response. Accordingly, in response to the registration response the apparatus may be caused to establish a connection between the user equipment and the selected network.

In some embodiments of the apparatus, the one or more networks further comprise one or more of a public network integrated non-public network or a network slice. In some embodiments of the apparatus, the access and mobility management function comprises a plurality of access and mobility management functions. Accordingly, each access and mobility function may be further associated with at least a respective network of the one or more networks such that each access and mobility function may cause broadcasting of respective onboarding support and/or authentication requirement information. In some embodiments of the apparatus, the onboarding support information is received and transmitted via a system information block transmission. In accordance with some embodiments of the apparatus, the system information block transmission is either transmitted in response to a request from the user equipment and/or as a continuous broadcast to a plurality of user equipment camping on a cell shared by the one or more networks.

According to another aspect of the present invention, there is provided a computer program product that comprises at least a non-transitory computer readable storage medium having program code portions stored thereon with the program code portions being configured, upon execution, to receive, from at least an access and mobility management function, onboarding support information and authentication requirement information associated with one or more networks. In some embodiments, the one or more networks comprise a public land mobile network or a stand-alone non-public network. Moreover, the program code portions can be configured to cause broadcast, to at least a user equipment, of the onboarding support information and the authentication requirement information. Some embodiments of the computer program product include program code portions that are further configured to receive, from the user equipment, a connection request comprising information identifying a selected network of the one or more networks, that supports onboarding for unsubscribed user equipment. In response, such embodiments may include program code portions configured to further transmit, to at least the access and mobility management function, a registration request, based on the network selection and the connection request. In some embodiments, the program code portions are additionally configured, upon execution, to receive, from at least the access and mobility management function, a registration response and establish a connection between the user equipment and the selected network.

In some embodiments of the computer program product, the one or more networks further comprise one or more of a public network integrated non-public network or a network slice. In some embodiments of the computer program product, the access and mobility management function comprises a plurality of access and mobility management functions. Accordingly, each access and mobility function may be further associated with at least a respective network of the one or more networks such that each access and mobility function may cause broadcasting of respective onboarding support and/or authentication requirement information. In some embodiments of the computer program product, the onboarding support information is received and transmitted via a system information block transmission. In accordance with some embodiments of the computer program product, the system information block transmission is either transmitted in response to a request from the user equipment and/or as a continuous broadcast to a plurality of user equipment camping on a cell shared by the one or more networks.

According to another aspect of the present disclosure, there is provided an apparatus that comprises means for receiving, from at least an access and mobility management function, onboarding support information and authentication requirement information associated with one or more networks. In some embodiments, the one or more networks comprise a public land mobile network or a stand-alone non-public network. The apparatus may further comprise means for causing one or more broadcasts of the onboarding support information and the authentication requirement information such that the broadcast is received by at least a user equipment. Some embodiments of the apparatus may further comprise means for receiving, from the user equipment, a connection request comprising information identifying a selected network of the one or more networks, that supports onboarding for unsubscribed user equipment. Moreover, the apparatus can include additional means for transmitting, to at least the access and mobility management function, a registration request, based on the network selection and the connection request and/or further means for transmitting, to at least the access and mobility management function, a registration request, based on the network selection and the connection request. In some embodiments the apparatus further comprises means for receiving, from at least the access and mobility management function, a registration response. Further, the apparatus may include means for establishing a connection between the user equipment and the selected network.

In some embodiments of the apparatus, the one or more networks further comprise one or more of a public network integrated non-public network or a network slice. In some embodiments of the apparatus, the access and mobility management function comprises a plurality of access and mobility management functions. Accordingly, each access and mobility function may be further associated with at least a respective network of the one or more networks such that each access and mobility function may cause broadcasting of respective onboarding support and/or authentication requirement information. In some embodiments of the apparatus, the onboarding support information is received and transmitted via a system information block transmission. In accordance with some embodiments of the apparatus, the system information block transmission is either transmitted in response to a request from the user equipment and/or as a continuous broadcast to a plurality of user equipment camping on a cell shared by the one or more networks.

According to another aspect of the present disclosure, there is provided a method comprising receiving, via a network, onboarding support information and authentication requirement information associated with each of a plurality of networks comprising one or more of a public land mobile network or a stand-alone non-public network. The method may further comprise selecting a network from the plurality of networks that supports onboarding of unsubscribed user equipment. The network is selected based on the onboarding support information and the authentication requirement information. Additionally, the method of this example embodiment includes selecting a cell of the selected network. According to some embodiments, the method may also comprise transmitting, via the network, a connection request for connection initiation with the selected network to an access and mobility management function associated with the selected network. Further, the method of an example embodiment may include receiving, via the network, registration information from the access and mobility management function. The registration information comprises additional onboarding support information required to connect to the selected network. Further, the method of this example embodiment comprises connecting to the selected network.

In some embodiments of the method, the plurality of networks further comprise one or more of a public network integrated non-public network or a network slice. In some embodiments of the method, the access and mobility management function comprises a plurality of access and mobility management functions with each access and mobility function being associated with a respective network of the plurality of networks. Accordingly, in such embodiments of the method, each access and mobility function may be configured to cause broadcasting of respective onboarding support information and the authentication requirement information. In some embodiments of the method, the onboarding support information and the authentication requirement information are received and transmitted via a system information block transmission and, as such, the system information block transmission is either transmitted in response to a request from a user equipment or as a continuous broadcast to a plurality of user equipment camped on a cell shared by the plurality of networks.

According to another aspect of the present disclosure, there is provided an apparatus that comprises at least one processor and at least one memory with the at least one memory including computer program code, that is configured to, with the at least one processor, cause the apparatus at least to receive, via a network, onboarding support information and authentication requirement information associated with each of a plurality of networks comprising one or more of a public land mobile network or a stand-alone non-public network. Additionally, the apparatus is caused to at least select a network from the plurality of networks that supports onboarding of unsubscribed user equipment. The network is selected based on the onboarding support information and the authentication requirement information. The apparatus of this example embodiment is also configured to select a cell of the selected network. In some embodiments the apparatus is further configured to transmit, via the network, a connection request for connection initiation with the selected network to an access and mobility management function associated with the selected network. Moreover, the apparatus may be caused, additionally, to receive, via the network, registration information from the access and mobility management function. The registration information comprises additional onboarding support information required to connect to the selected network. Some embodiments of the apparatus may be configured to connect to the selected network based on at least the registration information or other received information.

In some embodiments of the apparatus, the plurality of networks further comprise one or more of a public network integrated non-public network or a network slice. In some embodiments of the apparatus, the access and mobility management function comprises a plurality of access and mobility management functions with each access and mobility function being associated with a respective network of the plurality of networks. Accordingly, in such embodiments of the apparatus, each access and mobility function may be configured to cause broadcasting of respective onboarding support information and the authentication requirement information. In some embodiments of the apparatus, the onboarding support information and the authentication requirement information are received and transmitted via a system information block transmission and, as such, the system information block transmission is either transmitted in response to a request from a user equipment or as a continuous broadcast to a plurality of user equipment camped on a cell shared by the plurality of networks.

According to another aspect of the present invention, there is provided a computer program product that comprises at least a non-transitory computer readable storage medium having program code portions stored thereon with the program code portions being configured, upon execution, to receive, via a network, onboarding support information and authentication requirement information associated with each of a plurality of networks comprising one or more of a public land mobile network or a stand-alone non-public network. Additionally, the program code portions are configured, upon execution, to select a network from the plurality of networks that supports onboarding of unsubscribed user equipment. In some embodiments, the network is selected based on the onboarding support information and the authentication requirement information. The program code portions of this example embodiment may be further configured to select a cell of the selected network. In some embodiments the program code portions are further configured to transmit, via the network, a connection request for connection initiation with the selected network to an access and mobility management function associated with the selected network. Moreover, the program code portions may be configured to receive, via the network, registration information from the access and mobility management function. The registration information comprises additional onboarding support information required to connect to the selected network. Some embodiments may include program code portions configured, upon execution, to connect to the selected network based on at least the registration information or other received information.

In some embodiments of the computer program product, the plurality of networks further comprise one or more of a public network integrated non-public network or a network slice. In some embodiments of the computer program product, the access and mobility management function comprises a plurality of access and mobility management functions with each access and mobility function being associated with a respective network of the plurality of networks. Accordingly, in such embodiments of the computer program product, each access and mobility function may be configured to cause broadcasting of respective onboarding support information and the authentication requirement information. In some embodiments of the computer program product, the onboarding support information and the authentication requirement information are received and transmitted via a system information block transmission and, as such, the system information block transmission is either transmitted in response to a request from a user equipment or as a continuous broadcast to a plurality of user equipment camped on a cell shared by the plurality of networks.

According to another aspect of the present disclosure, there is provided an apparatus that comprises means for receiving, via a network, onboarding support information and authentication requirement information associated with each of a plurality of networks comprising one or more of a public land mobile network or a stand-alone non-public network. The apparatus may also comprise means for selecting a network from the plurality of networks that support onboarding of unsubscribed user equipment. The network, in some embodiments, is selected based on the onboarding support information and the authentication requirement information and, additionally, the apparatus may include means for selecting a cell of the selected network. According to some embodiments, the apparatus may also comprise means for transmitting, via the network, a connection request for connection initiation with the selected network to an access and mobility management function associated with the selected network. Further embodiments may include means for receiving, via the network, registration information from the access and mobility management function. According to such embodiments, the registration information may comprise additional onboarding support information required to connect to the selected network. Further, the apparatus may comprise means for connecting to the selected network.

In some embodiments of the apparatus, the plurality of networks further comprise one or more of a public network integrated non-public network or a network slice. In some embodiments of the apparatus, the access and mobility management function comprises a plurality of access and mobility management functions with each access and mobility function being associated with a respective network of the plurality of networks. Accordingly, in such embodiments of the apparatus, each access and mobility function may be configured to cause broadcasting of respective onboarding support information and the authentication requirement information. In some embodiments of the apparatus, the onboarding support information and the authentication requirement information are received and transmitted via a system information block transmission and, as such, the system information block transmission is either transmitted in response to a request from a user equipment or as a continuous broadcast to a plurality of user equipment camped on a cell shared by the plurality of networks.

Various other aspects are also described in the following detailed description and in the attached claims.

BRIEF DESCRIPTION OF THE DRAWINGS

Figure 1:
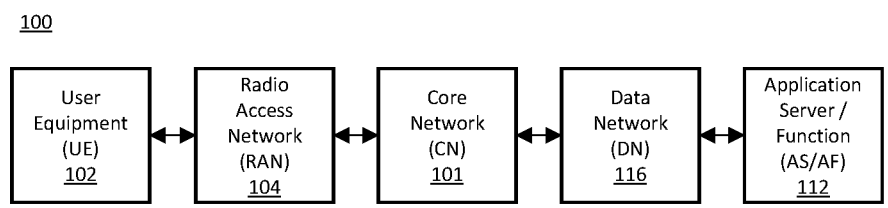
Figure 2:
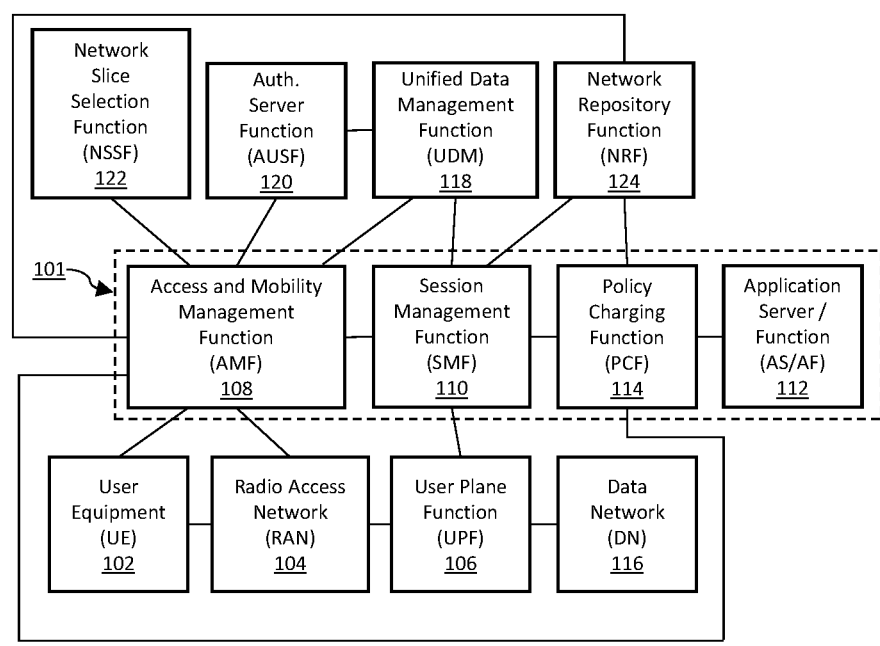
Figure 3:
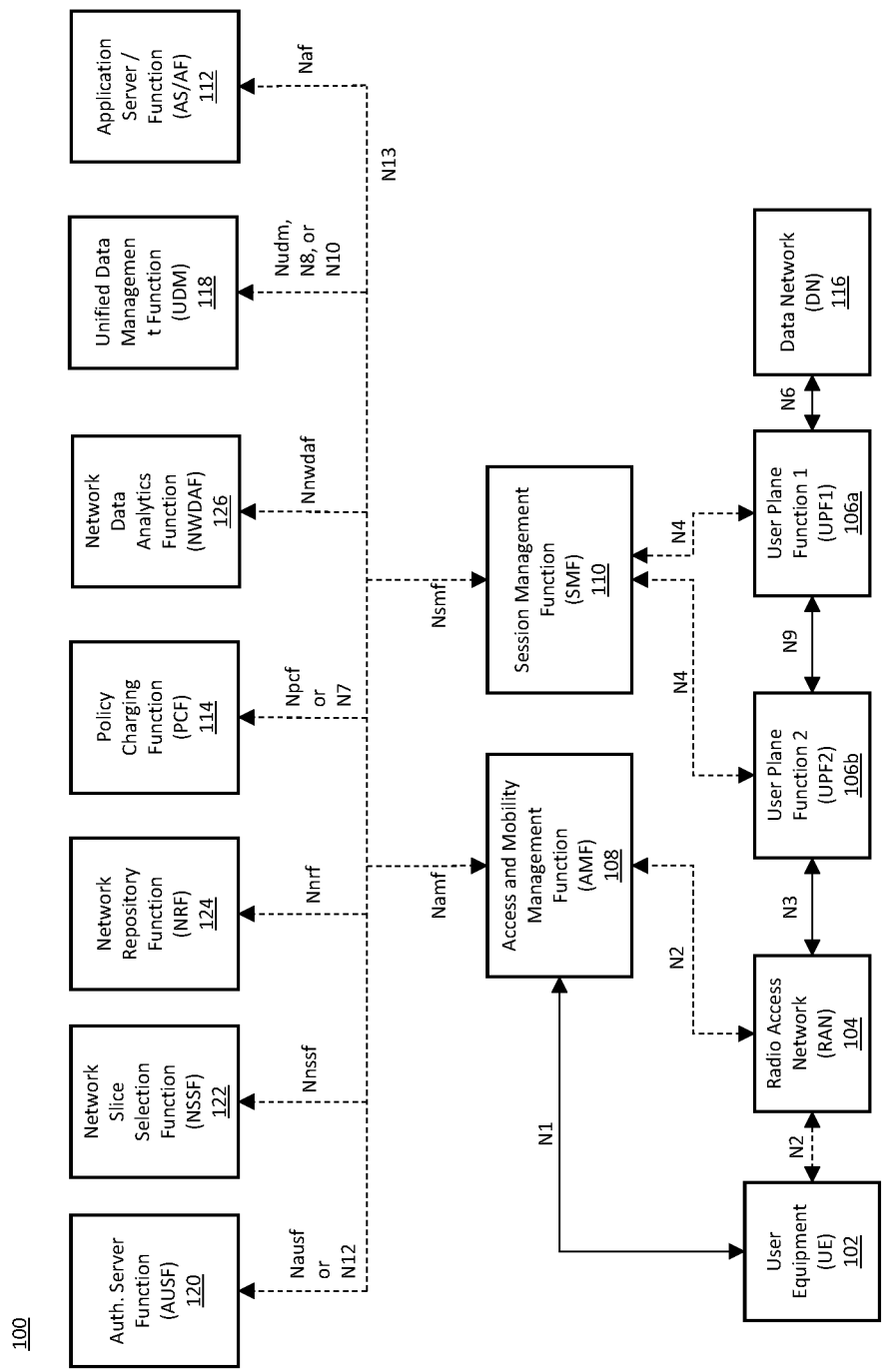
Figure 4:
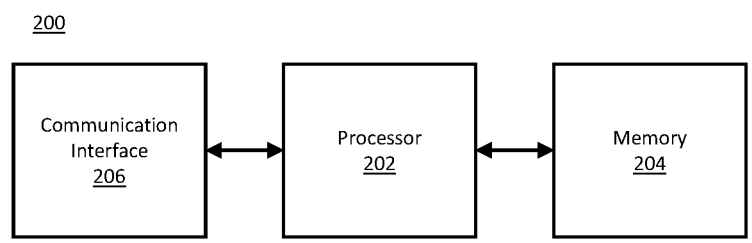
Figure 5:
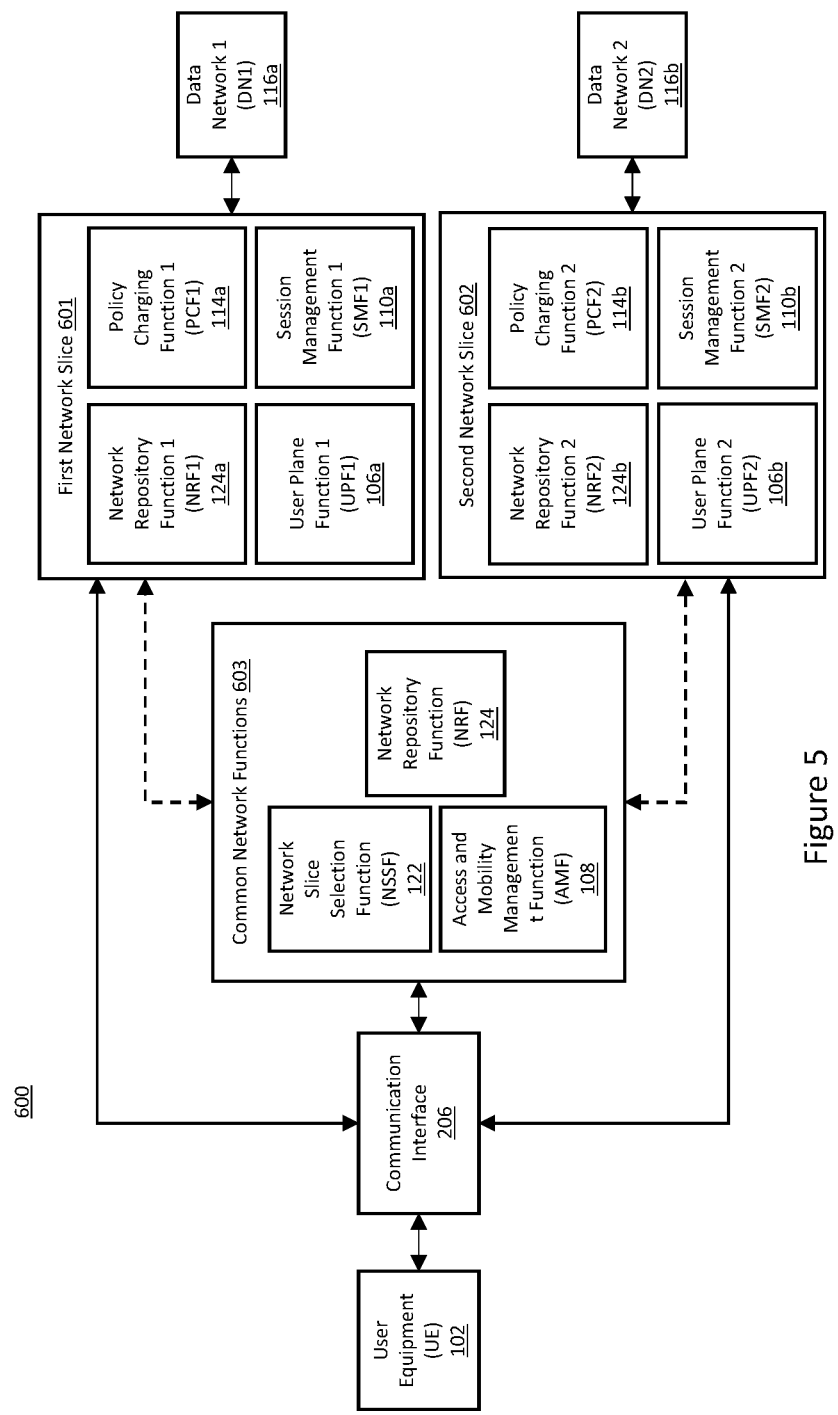
Figure 6:
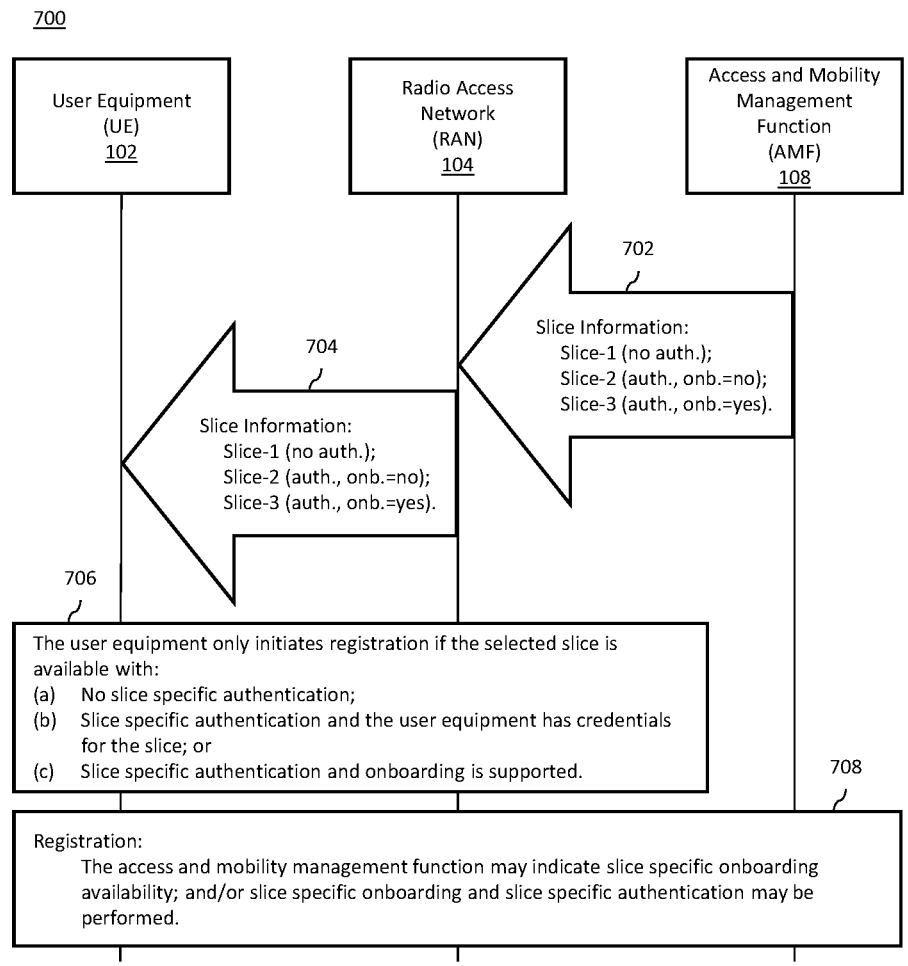
Figure 7:
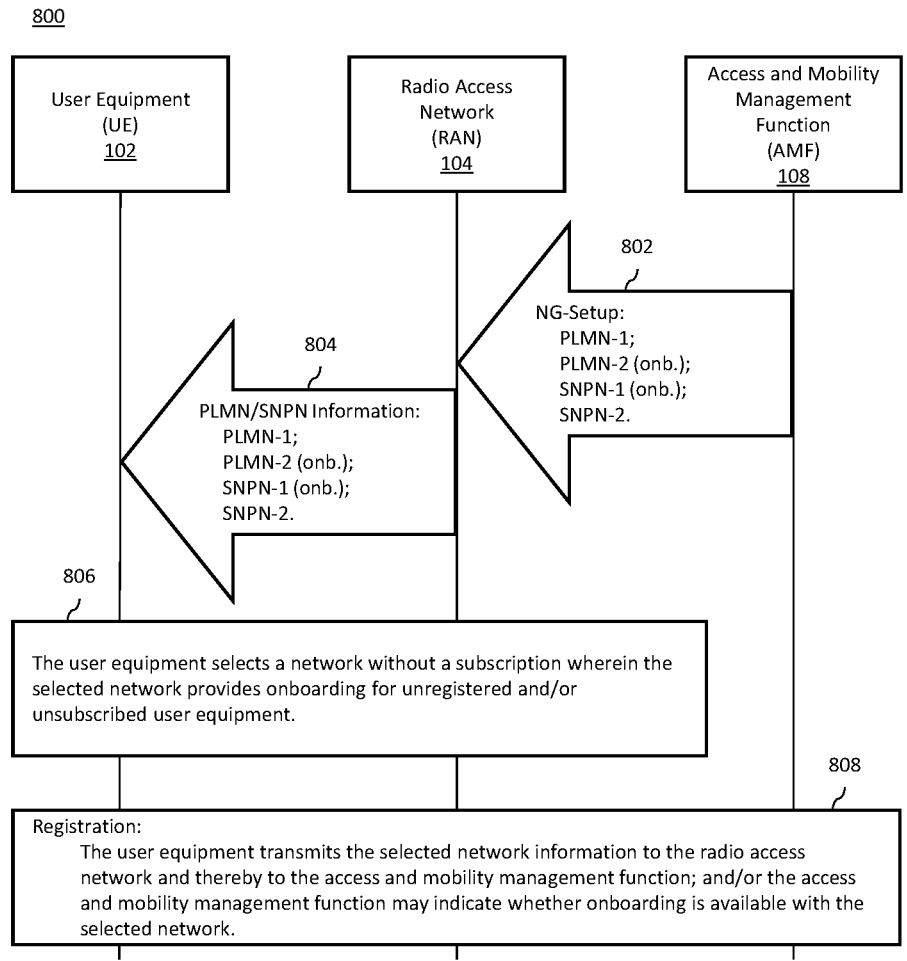
Figure 8:
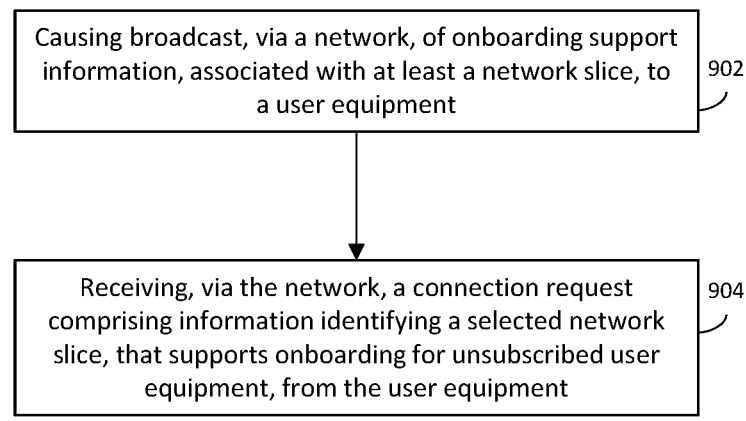
Figure 9:
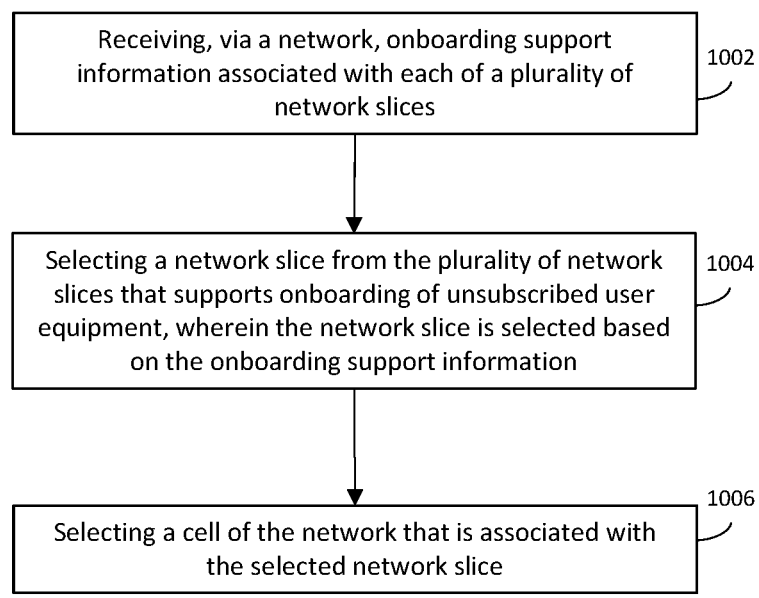
Figure 10:
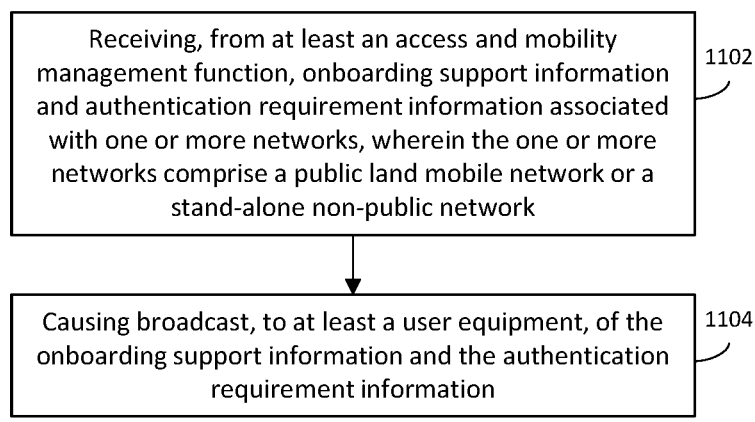
Figure 11:
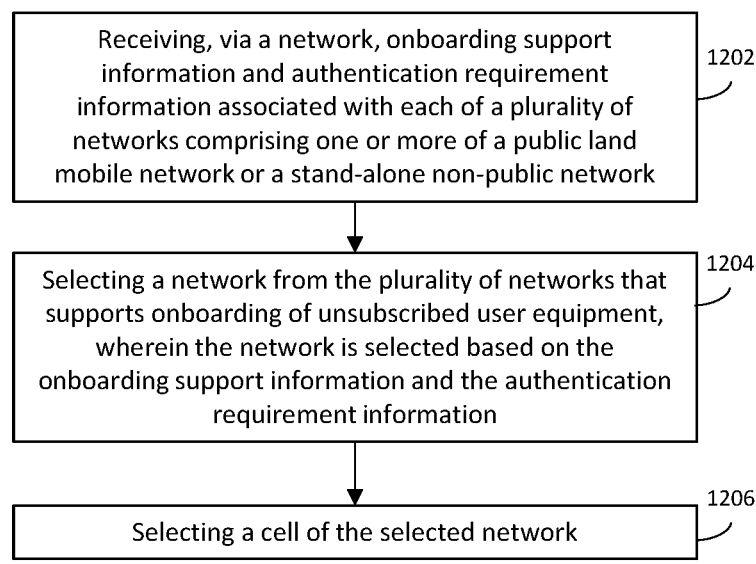

Having thus described embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 illustrates an example architecture for a communications network comprising network slices, according to some embodiments;

FIG. 6 is a flow diagram illustrating the signaling between communication devices via a network infrastructure, according to some embodiments;

FIG. 7 is a flow diagram illustrating communication transmissions, according to some embodiments, between communication devices via a network infrastructure;

FIG. 8 is a flow chart illustrating the operations performed, such as by a communication device or other client device, in accordance with some example embodiment;

FIG. 9 is a flow chart illustrating the operations performed, such as by a communication device or other client device, in accordance with some example embodiment;

FIG. 10 is a flow chart illustrating the operations performed, such as by a communication device or other client device, in accordance with some example embodiment; and FIG. 11 is a flow chart illustrating the operations performed, such as by a communication device or other client device, in accordance with some example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "computing device," "communication device," "user communication device," "terminal," and similar terms can be used interchangeably to refer to an apparatus, such as may be embodied by a computing device, configured to access a network or plurality of networks for at least the purpose of wired and/or wireless transmission of communication signals in accordance with certain embodiments of the present disclosure. Thus, use of any such terms should not be taken to limit the spirit and scope of embodiments of the present disclosure.

Additionally, as used herein, the terms "network slice," "specific slice," "slice," "network portion," and similar terms can be used interchangeably to refer to an end to end logical communication network, or portion thereof, within a PLMN, SNPN, PNI-NPN, or other network.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc (BD), the like, or combinations thereof), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail these example embodiments, certain general principles of a wired and/or wireless communication system, access systems thereof, and communication devices are briefly explained with reference to FIGS. 1-3 to assist in understanding the technology underlying the described examples.

According to some embodiments, a communication device or terminal can be provided for wireless access via cells, base stations, access points, the like (e.g., wireless transmitter and/or receiver nodes providing access points for a radio access communication system and/or other forms of wired and/or wireless networks), or combinations thereof. Such wired and/or wireless networks include, but are not limited to, networks configured to conform to 2G, 3G, 4G, LTE, 5G, and/or any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface (e.g., global positioning system receiver/transmitter, keyboard, mouse, touchpad, display, universal serial bus (USB), Bluetooth, ethernet, wired/wireless connections, the like, or combinations thereof). Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2, an S1, a similar interface, or combinations thereof. This interface can be used for example for coordination of operation of the stations and performing reselection or handover operations. The logical communication connection between the initial communication node and the final communication node of the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or combinations thereof. For example, the device can be a handheld data processing device equipped with radio receiver, data processing and user interface apparatus. Non-limiting examples include a mobile station (MS) such as a mobile phone or what is known as a 'smart phone,' a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, Universal Serial Bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device or user equipment. A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage, and other relevant control apparatus can be provided on an appropriate circuit board and/or in chipsets. Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via one or more appropriate apparatuses for receiving and transmitting signals (e.g., global positioning system receiver/transmitter, remote touchpad interface with remote display, Wi-Fi interface, etc.). In some embodiments, a radio unit can be connected to the control apparatus of the device. The radio unit can comprise a radio part and associated antenna arrangement. The antenna arrangement can be arranged internally or externally to the communication device.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment 102 (UE 102) and a Data Network 116 (DN 116) via a Core Network 101 (CN 101) of the communications network 100. The UE 102 can be associated with one or more devices associated with one or more network function (NF) service consumers. As illustrated in FIG. 1, a communications network 100 can be provided in which the UE 102 is in operable communication with the Radio Access Network 104 (RAN 104), such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, the like, or combinations thereof. In some embodiments, the DN 116 or the CN 101 can be in communication with an Application Server or Application Function 112 (AS/AF 112). The RAN 104, CN 101, DN 116, and/or AS/AF 112 can be associated with a Network Repository Function (NRF), NF service producer, Service Communication Proxy (SCP), Security Edge Protection Proxy (SEPP), Policy Charging Function (PCF), the like, or combinations thereof.

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a RAN 104, which can act as a relay between the UE 102 and other components or services of the CN 101. For instance, in some embodiments, the UE 102 can communicate with the RAN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106a, UPF 106b, collectively "UPF 106"). By way of example only, in some embodiments, the UPF 106 can be in communication with the RAN 104 and the DN 116. In other embodiments, the DN 116 can be in communication with a first UPF 106a and the RAN 104 can be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 can be configured to implement one or more Radio Access Technologies (RATs), such as Bluetooth, Wi-Fi, and Global System for Mobile Communication (GSM), Universal Mobile Telecommunications System (UMTS), LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (MIMO) antennas. In some embodiments, the communications network 100 can comprise Multi-User MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, Wi-Fi cellular convergence, Non-Orthogonal Multiple Access (NOMA), channel coding, the like, or combinations thereof.

As illustrated in FIG. 3, the UE 102 can be configured to communicate with the RAN 104 in a N1 interface, e.g., according to a Non-Access Stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in a Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a fifth-generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as server or other computing device are depicted in accordance with an example embodiment of the present disclosure. As described below in conjunction with the flowcharts and block diagrams presented herein, the apparatus 200 of an example embodiment can be configured to perform the functions described herein. In any instance, the apparatus 200 can more generally be embodied by a computing device, such as a server, a personal computer, a computer workstation or other type of computing device including those functioning as a user equipment and/or a component of a wireless network or a wireless local area network. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206.

Although not illustrated, the apparatus of an example embodiment may also optionally include a user interface, such as a touch screen, a display, a keypad, the like, or combinations thereof. Moreover, the apparatus according to example embodiments can be configured with a global positioning circuit that comprises a global positioning receiver and/or global positioning transmitter configured for communication with one or more global navigation satellite systems (e.g., GPS, GLONASS, Galileo, the like, or combinations thereof). The global positioning circuit may be configured for the transmission and/or receipt of direct/indirect satellite and/or cell signals in order to determine geolocation data (e.g., latitude, longitude, elevation, altitude, geographic coordinates, the like, or combinations thereof.) for the apparatus and/or another communication device associated with the apparatus or the one or more global navigation satellite systems.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, the like, or combinations thereof for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment of the present invention on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a Digital Signal Processor (DSP), a processing element with or without an accompanying DSP, or various other circuitry including integrated circuits such as, for example, an Application Specific Integrated Circuit (ASIC), a Field Programmable Gate Array (FPGA), a Micro-Controller Unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA, the like, or combinations thereof the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present invention by further configuration of the processor by instructions for performing the algorithms and/or operations described herein. The processor can include, among other things, a clock, an Arithmetic Logic Unit (ALU) and logic gates configured to support operation of the processor.

In embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as NF, NRF, a base station, an access point, SCP, UE 102, RAN 104, core network services, AS/AF 112, a database or other storage device, the like, or combinations thereof. In this regard, the communication interface can include, for example, one or more antennas and supporting hardware and/or software for enabling communications with a wireless communication network. Additionally or alternatively, the communication interface can include the circuitry for interacting with the one or more antennas to cause transmission of signals via the one or more antennas or to handle receipt of signals received via the one or more antennas. In some embodiments, the one or more antennas may comprise one or more of a dipole antenna, monopole antenna, helix antenna, loop antenna, waveguide, horn antenna, parabolic reflectors, corner reflectors, dishes, micro strip patch array, convex-plane, concave-plane, convex-convex, concave-concave lenses, the like or combinations thereof. In some environments, the communication interface can alternatively or also support wired communication. As such, for example, the communication interface can include a communication modem and/or other hardware/software for supporting communication via cable, Digital Subscriber Line (DSL), USB, the like or combinations thereof. In some embodiments, a session management function (e.g., SMF 110) can comprise a 5GC session management function for any suitable Control and User Plane Separation (CUPS) architecture, such as for the General Packet Radio Service (GPRS), Gateway GPRS Support Node Control plane function (GGSN-C), Trusted Wireless Access Gateway Control plane function (TWAG-C), Broadband Network Gateway Control and User Plane Separation (BNG-CUPS), N4-Interface, Sxa-Interface, Sxb-Interface, Sxc-Interface, Evolved Packet Core (EPC) Serving Gateway Control plane function (SGW-C), EPC Packet Data Network Gateway Control plane function (PGW-C), EPC Traffic Detection Control plane function (TDF-C), the like, or combinations thereof.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, Wireless Local Access Network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), the like, or combinations thereof. In addition, these signals can include speech data, user generated data, user requested data, the like, or combinations thereof.

For example, the apparatus 200 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, Session Initiation Protocol (SIP)), the like, or combinations thereof. For example, the apparatus 200 can be capable of operating in accordance with 2G wireless communication protocols Interim Standard (IS) 136 (IS-136), Time Division Multiple Access (TDMA), GSM, IS-95, Code Division Multiple Access, Code Division Multiple Access (CDMA), the like, or combinations thereof. In addition, for example, the apparatus 200 can be capable of operating in accordance with 2.5G wireless communication protocols GPRS, Enhanced Data GSM Environment (EDGE), the like, or combinations thereof. Further, for example, the apparatus 200 can be capable of operating in accordance with 3G wireless communication protocols, such as UMTS, Code Division Multiple Access 2000 (CDMA2000), Wideband Code Division Multiple Access (WCDMA), Time Division-Synchronous Code Division Multiple Access (TD-SCDMA), the like, or combinations thereof. The NA 200 can be additionally capable of operating in accordance with 3.9G wireless communication protocols, such as Long Term Evolution (LTE), Evolved Universal Terrestrial Radio Access Network (E-UTRAN), the like, or combinations thereof. Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable CUPS architecture, such as for the gateway GGSN-C, TWAG-C, Broadband Network Gateways (BNGs), N4-Interface, Sxa-Interface, Sxb-Interface, Sxc-Interface, EPC SGW-C, EPC PGW-C, EPC TDF-C, the like, or combinations thereof. Indeed, although described herein in conjunction with operation with a 5G system, the apparatus and method may be configured to operate in conjunction with a number of other types of systems including systems hereinafter developed and implemented.

Some of the embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4. The computer-readable medium can comprise a non-transitory computer-readable storage medium that can be any media that can contain or store the instructions for use by or in connection with an instruction execution system, apparatus, or device, such as a computer.

FIG. 5 illustrates an example communication network 600 that comprises two example network slices. The UE 102 utilizes at least Communication Interface 206 to establish one or more network connections by way of causing transmission and receipt of communication signals between the UE 102 via at least Communication Interface 206 and the Common Network Functions 603, the First Network Slice 601, and/or the Second Network Slice 602. It will be appreciated that, in some embodiments, the Communication Interface 206 can connect the UE 102 directly to the First Network Slice 601 and/or the Second Network Slice 602 thus bypassing the Common Network Functions 603. Additionally, it will be appreciated that Communication Interface 206 can connect the UE 102 indirectly to the First Network Slice 601 and/or the Second Network Slice 602 by establishing a connection through the Common Network Functions 603 first. In some embodiments, UE 102 can connect to a plurality of public and/or private networks and/or a plurality of public and/or private network slices by way of Communication Interface 206. In some embodiments, Communication Interface 206 may be communicably connected to one or more of a RAN, cell, gNB, ng-eNB, NodeB, the like, or combinations thereof such that communication signals can be transmitted and received therethrough.

In the illustrated embodiment, the First Network Slice 601 comprises a plurality of network functions including at least Network Repository Function 1 (NRF1) 124a, Policy Charging Function 1 (PCF1) 114a, User Plane Function 1 (UPF1) 106a, and Session Management Function 1 (SMF1) 110a. Each of the network functions of the First Network Slice 601 is independent of the Common Network Functions 603 and the network functions of the Second Network Slice 602. Further, the First Network Slice 601 is configured to connect the UE 102 to Data Network 1 (DN1) 116a. The Second Network Slice 602 comprises a plurality of network functions including at least Network Repository Function 2 (NRF2) 124b, Policy Charging Function 2 (PCF2) 114b, User Plane Function 2 (UPF2) 106b, and Session Management Function 2 (SMF2) 110b. Each of the network functions of the Second Network Slice 602 is independent of the Common Network Functions 603 and the network functions associated with the First Network Slice 601. Further, the Second Network Slice 602 is configured to connect the UE 102 to Data Network 2 (DN2) 116b.

In some embodiments, the example communication network 600 of FIG. 5 comprises one or more of a Public Land Mobile Network (PLMN), Stand-Alone Non-Public Network (SNPN), a Public Network Integrated NPN (PNI-NPN), and/or the like. For example, the First Network Slice 601 may be configured, with Common Network Functions 602, as part of a PLMN such that UE 102 can access the First Network Slice 601 without undergoing onboarding procedures or authentication of credentials. Additionally, the Second Network Slice 602 may be configured as a PNI-NPN which operates with the support of the PLMN, that comprises the First Network Slice 601 and Common Network Functions 602, but further requires that UE 102 belongs to a particular tenant type in order to be eligible to use the Second Network Slice 602. Moreover, to access the Second Network Slice 602 UE 102 will have to undergo an onboarding procedure and/or authentication of credentials that incorporates the credentials associated with UE 102 and one or more Service Level Agreements (SLAs) and/or subscriptions. In an instance UE 102 is already subscribed to the Second Network Slice 602 then procedures for authentication of credentials may be initiated, by UE 102 or the Second Network Slice 602, without the need for additional onboarding procedures or registration procedures. It will also be appreciated that the First Network Slice 601 and/or the Second Network Slice 602 may be configured, in accordance with some embodiments, as a network separate from example communication network 600, rather than as a network slice, such as an SNPN that supports authentication and/or onboarding procedures. Moreover, in some embodiments a plurality of additional network slices (e.g., a third network slice, fourth network slice, etc.) may be incorporated into example communication network 600 with each network slice configured with or without authentication feature requirements, with or without onboarding features for unregistered user equipment, and/or a plurality of network functions (e.g., an NRF, UPF, PCF, SMF, AS/AF, AUSF, DN, etc.).

FIG. 6 illustrates a flow chart that depicts an example signal sequence 700, for the provision of a network slice specific onboarding indication, between communication devices (e.g., apparatus 200, etc.) by way of at least a network infrastructure (e.g., communications network 100, 600, etc.). As shown, the example network infrastructure utilized for signal sequence 700 comprises at least AMF 108, RAN 104, and UE 102. In some embodiments, the network infrastructure may be configured in accordance with 5G system standards, or the like (e.g., 4G, LTE, etc.), and that RAN 104 can comprise one or more 5G radio nodes, such as one or more gNBs or equivalent. In some embodiments, the example signal sequence 700 may be implemented utilizing one or more network infrastructures associated with one or more networks (e.g., PLMN, SNPN, etc.) and each of the one or more networks comprises one or more network slices.

During signal sequence 700, the communications network, by way of AMF 108 and RAN 104, transmits information about the availability of onboarding for supported network slices to UE 102 prior to initial contact with AMF 108. As used herein, the initial contact with the AMF 108 references the initial contact with the AMF in relation to the establishment of a respective connection and does take into account any prior contact with the AMF 108, such as in conjunction with the establishment of prior connections or for other purposes other than the establishment of the respective connection. In some embodiments, information regarding supported network slices may alternatively, or additionally be transmitted during initial contact, or communications to establish a connection, between UE 102 and AMF 108, by way of RAN 104, whether initiated by UE 102 or AMF 108. Moreover, AMF 108 may be configured to continuously or repeatedly broadcast the supported network slices to one or more UEs camped on a cell of the associated network. A UE may be determined to be camped on a network in an instance that the UE remains in an idle mode within a cell, associated with the network, such that the UE is ready to initiate a potential dedicated service or is ready to receive an ongoing broadcast service from the network by way of at least a network function. By camping on a cell in an idle mode, or state, the UE is able to receive information pertinent to the camped network and/or initiate a connection with the camped network, for example, via an AMF and RAN. In some embodiments, a UE may be camped on a plurality of networks via a plurality of cells. In some embodiments UE 102 may request network and/or specific network slice information on-demand and/or in real-time upon receipt of an input signal from a user and/or an application associated with UE 102.

As shown, in block 702 AMF 108 transmits supported network slice information to RAN 104 for distribution to UE(s) associated with RAN 104. For example, UE 102 may be one of a plurality of UEs camped on the network via RAN 104. The slice information, shown in block 702, comprises information that details the authentication requirements and onboarding availability for one or more network slices that are supported by the RAN. In this example, the slice information relates to three supported network slices (e.g., Slice-1, -2, -3). For example, Slice-1 is shown not to require authentication of accessing UEs while Slice-2 and Slice-3 each require certain authentication credentials from UEs. Moreover, Slice-2 does not support onboarding for unregistered UEs while Slice-3 does support onboarding procedures for UE registration.

Block 704 depicts the slice information received by RAN 104 from AMF 108 being further transmitted from RAN 104 to UE 102. Upon receipt of the slice information, depicted in block 704, UE 102 initiates registration with the communication network in accordance with the slice information. As shown by block 706, UE 102 of an example embodiment may be configured to only initiate registration with particular network slices if certain conditions are available. For example, UE 102 can initiate registration with a network slice in an instance the network slice does not have slice specific authentication requirements (e.g., the network slice is publicly accessible), see block 706(*a*). Additionally, UE 102 can initiate registration with a network slice in an instance the network slice has slice specific authentication requirements and UE 102 meets those specific authentication requirements (e.g., UE 102 is associated with a paid subscription in accordance with an SLA), see block 706(*b*). Moreover, UE 102 can initiate registration with a network slice in an instance the network slice has slice specific authentication requirements and the network slice supports onboarding for UEs lacking the required credential requirements (e.g., UE 102 is not associated with a required paid subscription but the network slice is configured to enroll UE 102 in the required subscription in accordance with an SLA), see block 706(*c*). In some embodiments, UE 102 initiates registration with the selected network slice according with the received network slice information and/or through communication with the host network by way of RAN 104.

As shown in block 708, registration of UE 102 with AMF 108 is facilitated through RAN 104. The registration procedure comprises AMF 108, in response to a registration request received from UE 102, transmitting an indication of network slice specific onboarding availability to UE 102 in an instance further information is required or has not been previously received by UE 102. Additionally, or alternatively, the registration procedure comprises AMF 108, in response to a registration request received from UE 102, performing the network slice specific onboarding and network slice specific authentication procedures. It will be appreciated that AMF 108 may perform such procedures with support from other network functions (e.g., Common Network Functions 603 and/or network functions associated with First Network Slice 601 as described with respect to FIG. 5 herein). Upon completion of the registration process UE 102 is registered to access services provided by the selected network slice. In some embodiments, UE 102 may select and register with a plurality of network slices, the plurality of network slices may be associated with one or more networks.

According to some embodiments of signal sequence 700, AMF 108 may transmit information to a gNB of a 5G system regarding availability of supported network slices associated with the communication network. Such transmissions may be performed as part of a 3GPP defined NG-Setup and may further transmit information about secondary authentication requirements for each supported network slice upon receipt of a request for registration from UE 102. In accordance with such embodiments, the gNB may further be configured to transmit the supported network slice information to UE 102 prior to receipt of communication from UE 102.

FIG. 7 illustrates a flow diagram that depicts an example signal sequence 800, for communication of onboarding support indicators associated with PLMNs and SNPNs which utilize shared RANs (e.g., a shared gNB, etc.). The communication signal transmission, described with respect to signal sequence 800, occurs between communication devices (e.g., apparatus 200, etc.) by way of a network infrastructure (e.g., communications network 100, 600, etc.). As shown by FIG. 7, the example network infrastructure utilized for signal sequence 800 comprises at least AMF 108, RAN 104, and UE 102. In some embodiments, the network infrastructure may be configured in accordance with 5G system standards, or the like, and that RAN 104 can comprise one or more 5G radio nodes, such as one or more gNBs or equivalent. Moreover, the processes described with respect to FIG. 7 can be additionally facilitate communication of onboarding support indicators associated with PNI-NPNs and SNPNs which utilize shared RANs (e.g., a shared gNB, etc.). Indeed, it will be appreciated that such processes may be applied to access networks (e.g., RANs, etc.) shared among PLMNs, PNI-NPNs, SNPNs, networks, network slices, the like, or combinations thereof.

As shown by FIG. 7, the communications network, by way of AMF 108 and RAN 104, transmits information about the availability of onboarding support indicators specific to a plurality of PLMNs and SNPNs to UE 102 in accordance with signal sequence 800. AMF 108 causes transmission of the onboarding support indicators as part of the NG-Setup with RAN 104. During the NG-Setup process between AMF 108 and RAN 104, AMF 108 causes transmission of onboarding support indicators for PLMN-1, PLMN-2, SNPN-1, and SNPN-2, see block 802. As shown, PLMN-1 and SNPN-2 do not provide for onboarding procedures while PLMN-2 and SNPN-1 are identified by the NG-Setup transmission as providing for onboarding procedures. In some embodiments, the onboarding support indicators for one or more networks (e.g., PLMN-1, PLMN-2, SNPN-1, SNPN-2, etc.), and/or one or more network slices (e.g., a PNI-NPN associated with PLMN-1, Network Slices 601, 602, etc.), can be transmitted via one or more bundled communications that comprises onboarding support indicators for the one or more networks, and/or the one or more network slices, that utilize shared RAN 104. In accordance with other embodiments, the onboarding support indicators for the one or more networks, and/or the one or more network slices, can be transmitted via a plurality of separate communications wherein each of the plurality of separate communications comprises onboarding support indicators for a respective network or a respective network slice. The onboarding support indicators, in accordance with some embodiments, can be configured to comprise primary and/or secondary authentication information for a UE to access a PLMN, SNPN, PNI-NPN, network, network slice, the like, or combinations thereof. Moreover, some embodiments of the onboarding support indicators may be configured such that the onboarding support indicators are added into a System Information Block (SIB). In accordance with such embodiments, the SIB that comprises the onboarding support indicators, and/or primary and/or secondary authentication information, may be a legacy SIB (e.g., SIB1, etc.), a new SIB, an on-demand SIB, the like, or combinations thereof. Additionally, the SIB may be configured to comprise onboarding support indicators, and/or primary and/or secondary authentication information, for one or more networks and/or network slices.

Following transmission of the NG-Setup information and before UE 102 initiates a connection with RAN 104, RAN 104 causes transmission of network supported PLMN and SNPN information to UE 102, see block 804. As depicted by block 804 the PLMN and SNPN information comprises at least the onboarding support indicators for PLMN-1, PLMN-2, SNPN-1, and SNPN-2 as received by the RAN 104 from AMF 108, see block 802. In some embodiments, RAN 104 may be configured to continuously, periodically or repeatedly broadcast the onboarding support indicators associated with one or more networks, or network slices, to one or more UEs camped on a cell of the network. In some embodiments, the broadcasts may occur at predetermined time intervals (e.g., in response to a timer configured with the AMF) and/or in response to one or more network, or network slice, onboarding and/or authentication policy changes. Additionally, such broadcasts of the onboarding support indicators for one or more networks, or network slices, may be in response to a communication signal received from one or more UEs, by one or more networks or network slices. Moreover, the broadcasts may be transmitted by the one or more networks, or network slices, without receipt of prior communication from, or connections with, the one or more UEs. In some embodiments, RAN 104 can be configured to transmit the onboarding support indicators associated with the one or more networks, or network slices, in response to initiation of a connection with RAN 104 by UE 102. In accordance with such embodiments, RAN 104 can transmit the onboarding support indicators for the one or more networks or network slices that share RAN 104 during establishment of the initial connection with UE 102, such as initiated by UE 102.

Upon receipt of the PLMN and SNPN information, comprising at least the onboarding support indicators, UE 102 is configured, in response, to select a network, and/or network slice, associated with RAN 104. In an instance UE 102 is to select a network, and/or network slice, for which UE 102 does not have a subscription, UE 102 is further configured to select a network, and/or network slice, in accordance with the received onboarding support indicators such that the selected network, and/or the selected network slice, provides onboarding procedures for unregistered and/or unsubscribed UEs, see block 806. In this instance, UE 102 transmits the selection of the network, and/or network slice, with onboarding capabilities by way of RAN 104 to AMF 108 to initiate the connection and registration process. In response to receipt of UE 102's selection of a network, and/or network slice, AMF 108 completes the registrations and onboarding process to allow UE 102 access to the selected network, and/or the selected network slice, in accordance with the SLA. Moreover, AMF 108 may cause transmission of secondary or additional onboarding and/or authentication requirements to UE 102 as such additional requirements relate to the registration process for the selected network, and/or the selected network slice, see block 808.

According to some embodiments, in an instance a cell, RAN, gNB, the like, or combinations thereof is/are unable to provide one or more onboarding indications and/or authentication requirements to a UE prior or during connection to a network, an AMF and/or other network function may be configured to support the provision of the one or more onboarding indications and/or authentication requirements as part of the registration process. For example, in an instance a shared RAN is unable to transmit secondary authentication requirements to a UE prior to establishment of a connection with a respective network slice then the AMF associated with that network slice can be configured to cause transmission of the secondary authentication requirements to a UE during registration of the UE with the network slice.

FIG. 8 illustrates a flowchart of the operations of an example method 900 performed by an example apparatus 200 which, in some embodiments, may be embodied by a network-based computing device, such as an AMF or other network function, which may, in turn, be comprised of a computer program product comprising a non-transitory computer readable medium storing computer program code to be executed by processor 202. As shown in block 902, apparatus 200 of this example embodiment incudes means, such as the processor 202, the memory 204, the communication interface 206 or the like, for causing broadcast, via a network, by way of one or more shared RANs (e.g., gNB, ng-eNB, NodeB, etc.), of onboarding support information, associated with at least a network slice, to a user equipment. In some embodiments, the onboarding support information includes authentication information for one or more networks (e.g., PLMNs, SNPNs, etc.) and/or one or more network slices (e.g., PNI-NPNs, etc.) that utilize the shared RAN. As shown in block 904, apparatus 200 is further configured with means, such as the processor 202, the communication interface 206 or the like, for receiving, via the network, a connection request comprising information identifying a selected network slice, that supports onboarding for unsubscribed user equipment, from the user equipment. In response to at least the received connection request, apparatus 200 in some embodiments, may also include means, such as the processor 202, the communication interface 206 or the like, for registering the user equipment with the selected network slice. The registration of the user equipment with the selected network slice may comprise sending a network slice specific credential to the user equipment. Upon completion of the registration process, the apparatus 200 of an example embodiment may include means, such as the processor 202, the communication interface 206 or the like, for establishing a connection between the user equipment and the selected network slice by way of the network infrastructure.

As outlined by FIG. 8, a network is configured to broadcast onboarding support information associated with one or more network slices associated with the network. The broadcast of onboarding information is generated, at least partially, by an AMF of the network and transmitted, at least in part, by a RAN associated with the network to one or more UEs within a communicable range of the RAN. The one or more UEs may be camping on the network, and/or a network slice thereof, when the broadcast of onboarding information is received. In some embodiments, one or more UEs may receive the broadcast of onboarding information even if they are not camped on the network or a network slice thereof. A UE that receives the broadcast of onboarding information may be configured to utilize the onboarding support information and authentication requirement information from the broadcast in order to select a network slice. Since the UE selects the network slice based on the onboarding support information and authentication requirement information the UE can select a network slice for which the UE already has a subscription, and therefore can access. Additionally, or alternatively, the UE can select a network slice for which the UE does not have a subscription but which supports onboarding and therefore the UE can gain access to the network slice through a registration process. The UE then transmits this selection, based on the broadcast of onboarding information, back to the network's AMF by way of the RAN in order to initiate a connection with the selected network slice. Upon receipt of the connection request the AMF can further communicate with the UE, via the RAN, in order to connect the UE with the appropriate network slice. Moreover, if the UE requires a new subscription to access the selected network slice the AMF can process the registration request, and/or transmit additional information to the UE, in order to grant the UE access to the network slice.

FIG. 9 illustrates a flowchart of the operations of an example method 1000 performed by an example apparatus 200 which, in one embodiment, may be embodied by a computing device, such as the user equipment, which may, in turn, include a computer program product comprising a non-transitory computer-readable medium storing computer program code to be executed by processor 202. As shown in block 1002, apparatus 200 of this example embodiment incudes means, such as the processor 202, the memory 204, the communication interface 206 or the like, for receiving, via a network, onboarding support information associated with each of a plurality of network slices. The apparatus 200 includes means, such as the processor 202 or the like, for the selection of a network slice from the plurality of network slices that support onboarding of unsubscribed user equipment. The network slice is selected based on the received onboarding support information, see block 1004. Apparatus 200 may also include means, such as the processor 202 or the like, configured to select a cell of the network that is associated with the selected network slice, see block 1006. In some embodiments, apparatus 200 may additionally include means, such as the processor 202, the communication interface 206 or the like, configured to camp on the cell of the network associated with, e.g., including or otherwise supporting, the selected network slice. In some embodiments, apparatus 200 may also include means, such as the processor 202, the communication interface 206 or the like, for transmitting a connection request for connection initiation with the selected network slice to an access and mobility management function associated with the selected network slice by way of the network infrastructure. Additionally, registration procedures can be carried out, in accordance with some embodiments, between apparatus 200 and another communication device such that additional registration information may be received and transmitted by apparatus 200, such as by the processor 202, the communication interface 206 or the like, in order to connect to the selected network slice.

As outlined by FIG. 9, a UE, for example, is configured to receive, via at least a RAN, a broadcast of onboarding support information from a network. The broadcast of onboarding support information contains onboarding support information and authentication requirement information related to one or more network slices associated with the network. The broadcast thereby informs the UE which network slices are currently accessible, accessible with additional onboarding processes, or not accessible, to the UE. The UE can utilize the onboarding support information and authentication requirement information to select a network slice which the UE can access, either because the UE has a subscription for the network slice, can obtain a subscription via registration with the network slice, or the network slice does not implement any authentication requirements. The UE can then camp on the selected network slice and/or initiate a connection with the AMF associated with the network slice. If the network slice requires a new subscription then the UE can remain in communicable contact with the AMF, via the RAN, in order to complete a registration process and/or enroll in a subscription required for the selected network slice. In an instance the UE is already connected to, or camping on, a first network slice associated with the network then the UE may re-select a second network slice associated with the network based on the broadcast information, and/or additionally broadcast information, and/or re-connect, or camp on, the network via the second network slice.

FIG. 10 illustrates a flowchart of the operations of an example method 1100 performed by an example apparatus 200 which, in some embodiments, may be embodied by a computing device of the RAN which may, in turn, include computer program product comprising a non-transitory computer-readable medium storing computer program code to be executed by processor 202. As shown in block 1102, apparatus 200 of this example embodiment incudes means, such as the processor 202, the memory 204, the communication interface 206 or the like, for receiving, from at least an access and mobility management function, onboarding support information and authentication requirement information associated with one or more networks. In some embodiments, the one or more networks comprise one or more of a public land mobile network, a stand-alone non-public network, the like or combinations thereof. As shown in block 1104, apparatus 200 includes means, such as the processor 202, the communication interface 206 or the like, for causing broadcast, to at least a user equipment, of the received onboarding support information and the authentication requirement information. In some embodiments, apparatus 200 further includes means, such as the processor 202, the communication interface 206 or the like, configured to receive, from at least the user equipment, and transmit, to at least the access and mobility management function of a network, a connection request comprising information identifying a selected network that supports onboarding for unsubscribed user equipment from among the one or more networks identified by the onboarding support information and authentication requirement information. In some embodiments, apparatus 200 may additionally include means, such as the processor 202, the communication interface 206 or the like, that is configured to facilitate the establishment of a connection between the user equipment and the selected network.

As outlined by FIG. 10, a RAN, for example, may be shared by a plurality of networks, such as PLMNs and/or SNPNs. In some embodiments, the PLMNs may be publicly accessible to UEs within a communicable range of the RAN, however, at least a portion of one or more PLMNs may be restricted to UEs that meet certain predefined requirements. For example, a PLMN may comprise one or more PNI-NPNs which are only accessible to UEs with particular service provider subscriptions even though other portions, or network slices, of the PLMN may be publicly accessible. In order to alleviate network traffic between UEs inquiring about accessibility and particular networks providing individual accessibility responses thereto, the RAN may be configured to receive onboarding support information and authentication requirement information from the plurality of networks which share the RAN and cause a broadcast of this information to one or more UEs within communicable range of the RAN. In some embodiments, the UEs may already be camping on, or connected to, a network via the RAN. The UEs can then utilize this broadcast information to select one or more PLMNs and/or SNPN, for camping on and/or connecting to, via the RAN. In an instance an unsubscribed UE selects, for example, an SNPN that supports onboarding the RAN can facilitate communications between the unsubscribed UE and the SNPN in order to complete a registration process and/or enroll the UE in a subscription associated with the SNPN. The UE and the selected network can then establish a connection by way of at least the RAN such that the UE may access functions or services provided by the selected network. In some embodiments, a UE may continue to receive broadcasts from the RAN regarding onboarding support information and authentication requirement information. In accordance with such embodiments, the UE may be configured to re-select and/or re-connect to, and/or re-register with, one or more other networks, sharing the RAN, in order to access services or functions not supported by the network to which the UE is currently connected.

FIG. 11 illustrates a flowchart of the operations of an example method 1200 performed by an example apparatus 200 which, in one embodiment, may be embodied by user equipment which, in turn, may include a computer program product comprising a non-transitory computer readable medium storing computer program code executed by processor 202. As shown in block 1202, apparatus 200 of this example embodiment incudes means, such as the processor 202, the memory 204, the communication interface 206 or the like, for receiving, via a network, onboarding support information and authentication requirement information associated with each of a plurality of networks comprising one or more of a public land mobile network or a stand-alone non-public network. Moreover, apparatus 200 includes means, such as the processor 202 or the like, for additionally selecting a network from the plurality of networks that supports onboarding of unsubscribed user equipment. Accordingly, the network is selected based on the onboarding support information and the authentication requirement information, see block 1204. As shown in block 1206, apparatus 200 of an example embodiment also includes means, such as the processor 202, the communication interface 206 or the like, for selecting a cell of the selected network. In some embodiments, apparatus 200 may additionally include means, such as the processor 202, the communication interface 206 or the like, for camping on the selected cell associated with the selected network. Moreover, apparatus 200 according to some embodiments may also include means, such as the processor 202, the communication interface 206 or the like, that is configured to facilitate at least a portion of the registration process in order to register with the selected network and establish a connection to the selected network upon completion of the registration process and verification of registration credentials obtained by apparatus 200.

As outlined by FIG. 11, a UE, for example, is configured to receive, via at least a RAN, a broadcast of onboarding support information from a network. The broadcast of onboarding support information comprises onboarding support and/or authentication requirement information related to one or more PLMNs and/or SNPNs utilizing the shared RAN. The broadcast thereby informs the UE which PLMNs and/or SNPNs are currently accessible to the UE. The broadcast may also inform the UE which PLMNs and/or SNPNs are accessible to the UE with additional onboarding processes such as registering with a particular service provider and/or enrolling in a subscription. Additionally, the broadcast may also inform the UE which PLMNs and/or SNPNs are inaccessible to the UE because the UE lacks the predefined credentials specified for the particular PLMN/SNPN and the particular PLMN/SNPN does not support onboarding of unsubscribed UEs. The UE can, therefore, utilize the onboarding support and authentication requirement information to select a PLMN or SNPN which the UE can access. The UE may be able to access a selected network because the UE has a subscription for the selected network or the UE can obtain a subscription via onboarding procedures provided by the selected network. Additionally, the UE may be able to access the selected network because the network does not institute any authentication requirements and is therefore publicly accessible. The UE can then choose whether to camp on the selected network and/or initiate a connection with the AMF associated with the network. If the selected PLMN/SNPN requires a new subscription then the UE can remain in communicable contact with the AMF, via the RAN, in order to complete a registration process and/or enroll in a subscription required for the selected PLMN/SNPN. In an instance the UE is already connected to, or camping on, a first network associated with the shared RAN then the UE may re-select, and/or re-connect to, a second network based on the broadcast information, or additionally broadcast information.

It will be appreciated, in light of the present disclosure, that such procedures as described herein with respect to FIGS. 6-11 provide for improvements over traditional systems. Traditional systems for onboarding and registration of unsubscribed UE may require trial and error communication attempts between the accessing UE and the AMF associated with the network in order to establish a connection with a network slice that is accessible to the UE. Such traditional systems may require that the UE establishes a connection with the AMF before network information regarding authentication and/or onboarding can be transmitted to the UE. It will be appreciated, in light of the present disclosure, by one of ordinary skill in the art that traditional methods that consist of trial and error communication attempts between the UE and the AMF associated with the network may cause increased resource demands for both the communication network and UE. For example, traditional methods that rely on an established connection between the UE and the network prior to the UE's receipt of authentication and onboarding information increase communication signal traffic through the RAN of the network as the UE must connect to a network that the UE potentially cannot access. Such issues associated with traditional systems are further exacerbated when the RAN is shared by a plurality of network slices, SNPNs, PLMNS, and/or PNI-NPNs each with respective authentication and onboarding requirements that may or may not match the subscriptions or SLAs associated with the UE. In such instances, with traditional systems, the UE would have to connect and request information from each of the plurality of network slices, SNPNs, PLMNS, and/or PNI-NPNs.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present invention and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, or the like, above can be modified or further amplified. Furthermore, in some embodiments, additional optional operations, methods, steps, processes, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, processes, or the like, required particular hardware such hardware may be considered as part of apparatus 200 for any such embodiment.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

What is claimed is:

1. An apparatus comprising:
   at least one processor; and
   at least one memory including computer program code,
   the at least one memory and the computer program code configured to, with the at least one processor, cause the apparatus at least to:
   prior to an initial contact with an access and mobility management function (AMF in relation to an establishment of a respective connection, receive, from a radio access network (RAN) via a System Information Block (SIB) broadcast, onboarding support information associated with each of a plurality of network slices supported by a shared radio access network, the onboarding support information received as part of a broadcast generated responsive to an NG-Setup procedure between the AMF and the RAN, wherein the onboarding support information comprises a network slice specific authentication requirement and a network slice specific onboarding availability for each of the plurality of network slices, wherein the onboarding support information is relayed to the apparatus without prior establishment of a radio resource control connection, and wherein the network slice specific authentication requirement comprises an indication of whether an authentication of the user equipment with each of the plurality of network slices is required for registering the user equipment with the selected network slice, and wherein the network slice specific onboarding availability comprises an indication of whether onboarding is supported by each of the plurality of network slices;
   determine, based on the received onboarding support information, that a first network slice among the plurality of network slices requires slice-specific authentication credentials and supports onboarding procedures for unsubscribed user equipment;
   based on the determining, select the first network slice for registration;
   select a cell of the network that is associated with the first network slice; and
   while the apparatus is in an idle state:
   tune to and maintain monitoring of the cell associated with the first network slice; and
   receive broadcast control information from the cell; and
   initiate, after the apparatus transitions from the idle state to an active connected state, a registration request to the AMF to perform an onboarding and subscription-enrollment procedure with the first network slice.

2. The apparatus according to claim 1, wherein the onboarding support information is received via a system information block transmission, and wherein the system information block transmission is transmitted in response to a request from a user equipment.

3. The apparatus according to claim 1, wherein the onboarding support information is received via a system information block transmission, and wherein the system information block transmission is as a continuous broadcast to a plurality of user equipment camped on a cell shared by the plurality of networks.

\* \* \* \* \*